United States Patent
Guo

(10) Patent No.: US 12,063,528 B2
(45) Date of Patent: Aug. 13, 2024

(54) ANOMALY DETECTION METHOD AND DEVICE, TERMINAL AND STORAGE MEDIUM

(71) Applicant: XI'AN ZHONGXING NEW SOFTWARE CO., LTD., Xi'an (CN)

(72) Inventor: Tian Guo, Shenzhen (CN)

(73) Assignee: XI'AN ZHONGXING NEW SOFTWARE CO., LTD., Xi'an (CN)

(*) Notice: Subject to any disclaimer, the term of this patent is extended or adjusted under 35 U.S.C. 154(b) by 596 days.

(21) Appl. No.: 17/278,483

(22) PCT Filed: Aug. 28, 2020

(86) PCT No.: PCT/CN2020/112150
§ 371 (c)(1),
(2) Date: Mar. 22, 2021

(87) PCT Pub. No.: WO2021/057382
PCT Pub. Date: Apr. 1, 2021

(65) Prior Publication Data
US 2022/0124517 A1  Apr. 21, 2022
US 2023/0140836 A9  May 4, 2023

(30) Foreign Application Priority Data

Sep. 23, 2019 (CN) .......................... 201910901446.4

(51) Int. Cl.
*H04W 24/02* (2009.01)
*H04L 41/0816* (2022.01)
(Continued)

(52) U.S. Cl.
CPC ......... *H04W 24/02* (2013.01); *H04L 41/0816* (2013.01); *H04L 41/0893* (2013.01); *H04L 41/142* (2013.01)

(58) Field of Classification Search
CPC .. H04W 24/02; H04W 24/04; H04L 41/0816; H04L 41/0893; H04L 41/142;
(Continued)

(56) References Cited

U.S. PATENT DOCUMENTS 10,505,825 B1 * 12/2019 Bettaiah ................ G06F 16/285
2016/0124966 A1   5/2016 Cohen
(Continued)

FOREIGN PATENT DOCUMENTS

CN   105873105 A   8/2016
CN   107231649 A   3/2017
(Continued)

OTHER PUBLICATIONS

The State Intellectual Property Office of People's Republic of China. First Office Action for CN Application No. 2019109014464 and English translation, mailed Sep. 26, 2021, pp. 1-9.
(Continued)

*Primary Examiner* — Tanmay K Shah
(74) *Attorney, Agent, or Firm* — Vivacqua Crane, PLLC

(57) ABSTRACT

An anomaly detection method and device, a terminal and a storage medium are disclosed. The method may include: generating at least one clustering set of objects based on configuration data and performance indicator data of the objects; determining an algorithm configuration parameter corresponding to each clustering set based on a preset anomaly detection algorithm and the performance indicator data corresponding to the objects in the clustering set; and determining, based on the algorithm configuration parameter, abnormal performance indicator data of the objects in the corresponding clustering set, so as to determine abnormal objects based on the abnormal performance indicator data.

24 Claims, 10 Drawing Sheets generate at least one clustering set of objects based on configuration data and performance indicator data of the objects — 210 determine an algorithm configuration parameter corresponding to each clustering set based on a preset anomaly detection algorithm and the performance indicator data corresponding to the objects in the clustering set — 220 determine abnormal performance indicator data of the objects in the corresponding clustering set based on the algorithm configuration parameter, so as to determine abnormal objects based on the abnormal performance indicator data — 230

(51) Int. Cl.
  *H04L 41/0893* (2022.01)
  *H04L 41/142* (2022.01)
(58) Field of Classification Search
  CPC .............. H04L 41/149; H04L 41/0806; H04L 41/0895; H04L 41/40; H04L 43/02; H04L 43/20; H04L 41/147; H04L 43/16; G06F 18/214; G06F 18/23
  USPC ......................................................... 455/418
  See application file for complete search history.

(56) References Cited

U.S. PATENT DOCUMENTS

| | | | |
|---|---|---|---|
| 2017/0034720 A1 | 2/2017 | Gopalakrishnan et al. | |
| 2017/0094537 A1 | 3/2017 | Yang et al. | |
| 2017/0200088 A1 | 7/2017 | Yang et al. | |
| 2017/0364819 A1 | 12/2017 | Yang | |
| 2018/0220312 A1* | 8/2018 | Guttenfelder | G01S 19/23 |
| 2020/0092159 A1* | 3/2020 | Thampy | H04L 43/08 |

FOREIGN PATENT DOCUMENTS

| | | |
|---|---|---|
| CN | 109843653 A | 4/2019 |
| CN | 110061854 A | 7/2019 |
| CN | 110062410 A | 7/2019 |
| CN | 111199252 A | 5/2020 |

OTHER PUBLICATIONS

The State Intellectual Property Office of People's Republic of China. First Search Report for CN Application No. 2019109014464 and English translation, mailed Sep. 26, pp. 1-3.
European Patent Office. Extended European Search Report for EP Application No. 20864266.0, mailed Nov. 18, 2021, pp. 1-15.
International Search Report and Written Opinion for the International Patent Application No. PCT/CN2020/112150 dated Dec. 1, 2020.

* cited by examiner

ANOMALY DETECTION METHOD AND DEVICE, TERMINAL AND STORAGE MEDIUM

CROSS-REFERENCE TO RELATED APPLICATION

This application is a national stage filing under 35 U.S.C. § 371 of international application number PCT/CN2020/112150, filed Aug. 28, 2020, which claims priority from Chinese Patent Application No. 201910901446.4, filed on 23 Sep. 2019. The contents of these applications are incorporated herein by reference in their entirety.

TECHNICAL FIELD

Embodiments of the present application relates to a wireless communication network, in particular to an anomaly detection method and device, a terminal and a storage medium.

BACKGROUND

The operation and maintenance of current wireless communication systems and the evaluation of network quality and performance are implemented based on basic Performance Indicators (PIs) and Key Performance Indicators (KPIs). A huge volume of PI and KPI data (i.e., performance indicator data) will be generated during the operation of wireless communication network systems. When facing such scale of performance indicator data, there are limitations in terms of accuracy and self-adaptability if any abnormal performance indicator data is detected by manual analysis.

SUMMARY

In view of this, embodiments of the present application provide an anomaly detection method, including: generating at least one clustering set of objects based on configuration data and performance indicator data of the objects; determining an algorithm configuration parameter corresponding to each clustering set based on a preset anomaly detection algorithm and the performance indicator data corresponding to the objects in the clustering set; and determining, based on the algorithm configuration parameter, abnormal performance indicator data of the objects in the corresponding clustering set, so as to determine abnormal objects based on the abnormal performance indicator data.

Embodiments of the present application provide an anomaly detection device, including: a clustering set generation module, configured to generate at least one clustering set of objects based on configuration data and performance indicator data of the objects; a parameter determination module, configured to determine an algorithm configuration parameter corresponding to each clustering set based on a preset anomaly detection algorithm and the performance indicator data corresponding to the objects in the clustering set; and an anomaly detection module, configured to determine, based on the algorithm configuration parameter, abnormal performance indicator data of the objects in the corresponding clustering set, so as to determine abnormal objects based on the abnormal performance indicator data.

Embodiments of the present application provide a terminal, including: a memory, and one or more processors, where the memory is configured to store one or more programs; and the one or more programs, when executed by the one or more processors, cause the one or more processors to perform the anomaly detection method of any one of the embodiments of the present application.

Embodiments of the present application provide a storage medium storing a computer program, where the computer program, when executed by a processor, causes the processor to perform the anomaly detection method of any one of the embodiments of the present application.

With respect to the above embodiments and other aspects of the present application and implementations thereof, more description is provided in the brief description of drawings, detailed description and claims.

DETAILED DESCRIPTION

In order to make the purposes, technical themes and advantages of the present application clearer, the following will describe the embodiments of the present application in detail with reference to the accompanying drawings. It should be noted that the embodiments of the present application and the features in the embodiments may be arbitrarily combined to derive other embodiments not explicitly described.

Figure 1:
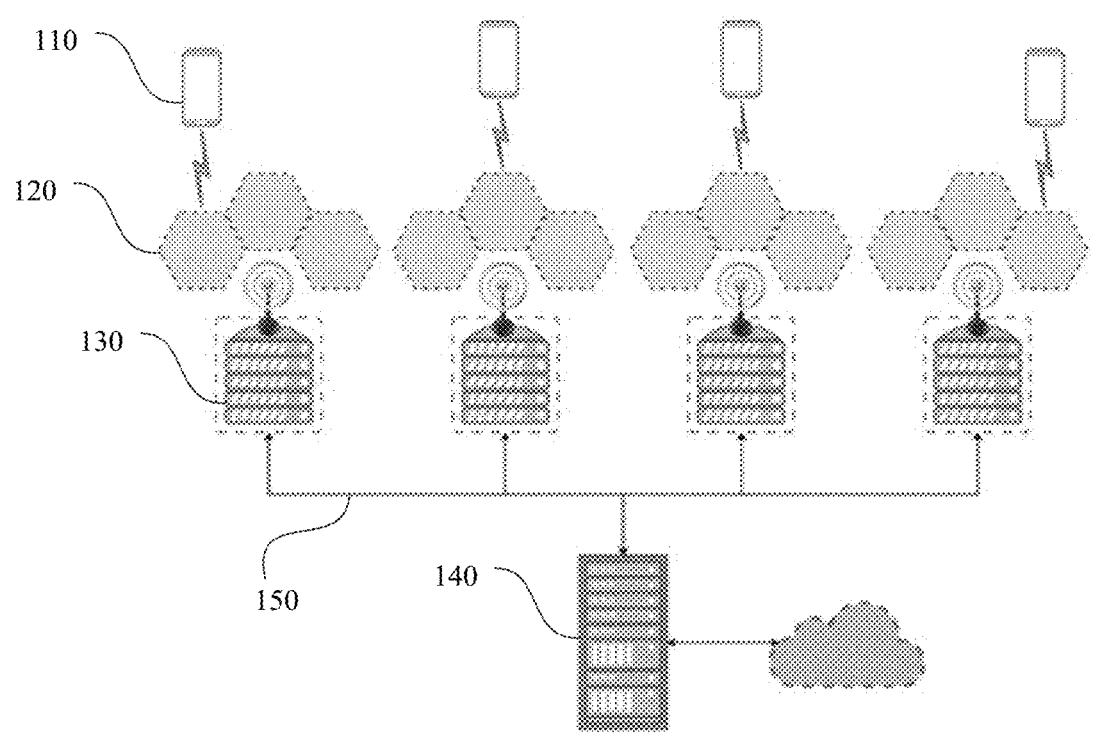
FIG. 1 is a schematic diagram of a basic architecture of an existing wireless communication network system.

For ease of understanding, a brief introduction to a basic architecture of a wireless communication network system is given first. FIG. 1 is a schematic diagram of a basic architecture of an existing wireless communication network system. As shown in FIG. 1, the wireless communication network system mainly includes objects such as a core network 140, base stations 130, cells 120, terminals 110 and transmission links 150. It should be noted that the objects include function modules for constructing a wireless communication network system. The objects are not limited to those listed above, but may also be a baseband processing module, a radio frequency processing module, etc., which are not specifically defined in the embodiments of the present application.

The terminal 110 is a general term for network access devices used by users. For example, the terminal may be a mobile phone. The terminal and the base station conduct wireless data interaction through their respective antennas, and then access the network for uploading services (such as voice calls or Internet access).

The base station 130 is a core device for constructing the wireless communication network system. It interacts upward with the terminal through a wireless communication protocol and downward with the core network through the transmission link, and is responsible for forming a data channel between the terminal and the core network. Most wireless communication protocols are implemented in the base station.

The cell 120 is a virtual management object. In order to achieve an optimal balance between wireless signals in a service area of the system in terms of coverage, interference, access capacity and other factors, planners generally divide the entire service area into many cells and set different parameters for each cell. In most cases, the terminal will generally access the network through a geographically close cell.

The core network 140 is responsible for end user authentication, billing, and processing of all service data. When the base station forms a data channel between the terminal and the core network, the service data (such as voice data and Internet data) initiated by the terminal needs to be processed or forwarded through the core network.

The transmission link 150 generally refers to a wired transmission link connecting the base station and the core network. Since all terminal service data are eventually aggregated to the core network through the base station, there are generally high requirements on the bandwidth, reliability and delay of the transmission link.

It should be noted that FIG. 1 is only a schematic diagram of the architecture of the wireless communication network system, and the actual network architecture of the wireless communication network system is more complicated. However, the network architecture shown in FIG. 1 is conceptually correct, and can help understand the basic structure of the wireless communication network system and the technical problems to be solved by the embodiments of the present application.

In order to facilitate the operation and maintenance of the wireless communication network system and to set a unified evaluation standard for network quality and performance, the 3GPP standard organization has formulated a batch of basic performance indicators (PIs) and key performance indicators (KPIs) in several standard documents, and has given the meaning, collection contents, collection conditions and related operational formulas of the indicators. All communication device manufacturers are required to comply with the requirements of the standard, implement and report these PIs in a network device, summarize the PIs in a network management system (hereinafter referred to as NMS), and calculate the KPIs according to the formula. In addition, device manufacturers and operators generally also design and implement a batch of PIs or KPIs beyond the standard according to their own specific needs to monitor the key operation state of the system.

In most cases, the wireless communication network system will generate a surprisingly huge volume of KPI and PI data during its operation. With data on such a scale, it is very difficult to try to analyze the data manually and find anomalies therein. The NMS generally implements some auxiliary functions to help operation and maintenance personnel observe and analyze the data. For example, the NMS provides a visual Kanban system, which allows users to observe and understand data in the form of charts. For another example, the NMS provides descending sorting and screening functions, so that users can focus on the indicators with the greatest amount of variation. For another example, the NMS provides an alarm system, so that the user can set an alarm threshold or rule for the specified indicators. When the indicator value exceeds the threshold or triggers the rule, the alarm system will report an alarm to let users know of system anomalies.

Although the above functions provided by the NMS can relieve some of the burden of manual analysis of indicators, there are still some shortcomings. For example, the analysis coverage is low. Even with the aid of the Kanban system, TopN or screening tools, the number of indicators that can be manually observed and analyzed at the same time is still very limited (generally no more than 10), which is mainly due to the inherent limitations of human beings. For another example, it is difficult to specify appropriate alarm thresholds or trigger rules. A communication system is complicated and changeable, and different time, space, business scenarios and configurations will have different effects on the performance of the same indicators. It is difficult to accurately define what is abnormal or normal for relevant indicators in such changeable scenarios only by human experience and knowledge.

In order to make up for the deficiencies of the auxiliary analysis function of the traditional NMS, some improvement schemes are put forward. These improvement schemes consist of two main categories.

The first is to manually maintain an empirical knowledge base for anomaly detection. The empirical knowledge base may be in the form of marked historical performance indicator data (i.e., abnormal performance indicator data has been marked), and may be a set of pattern recognition rules. The former is generally used to assist statistical training procedures to obtain detection thresholds, while the latter is used directly to detect abnormal performance indicator data.

The second is to analyze historical performance indicator data by statistical analysis methods, so to obtain a threshold for distinguishing abnormal and normal performance indicator data by calculation, and apply the threshold to the detection of current performance indicator data.

The first category of scheme continues the method of expert system to solve problems, and has similar effects as follows: the more complete the expert rules available in the system, the more accurate the results. If the problems to be solved do not change significantly, then the expert system will operate well. However, the actual situation is generally not so ideal, and usually has the following limitations: the cost of manually collecting and summarizing expert rules is very high; due to the limitations of human beings, it is difficult to guarantee the completeness and accuracy of expert rules. In reality, many problems to be solved are changing.

Although the need for expert experience and rules as well as the cost of manual intervention or guidance are reduced by adopting the second category of scheme for anomaly detection of performance indicator data, there are still some limitations as follows.

First, most anomaly detection algorithms still require users to set up an algorithm configuration parameter. Although the workload and difficulty of setting parameters are far less than that of specifying detection rules directly, the quality of parameters provided by users still directly affects the accuracy of the results output from the algorithms. For extremely complex and huge systems such as a wireless communication network system, it is very difficult for users to provide appropriate algorithm configuration parameter for different time, space and objects.

Second, most anomaly detection algorithms have some assumptions about the characteristic pattern of anomalies (e.g., for the k-nearest neighbor algorithm, it is assumed that anomalies must be far away from all dense neighborhoods). However, in practice, the abnormal patterns of the same object may be different in different time ranges. In other words, the abnormal patterns of two similar objects may be different in the same time range. Under such a premise, it is difficult for algorithms with basically fixed parameter configurations to make accurate anomaly detection for objects under different conditions.

Third, the current mainstream algorithms for anomaly detection basically take historical performance indicator data as the only input, which means that the algorithms predict the future of performance indicator data based only on its history, which affects the accuracy of detection results.

In view of this, an embodiment of the present application provides an anomaly detection method to solve the above technical problems.

Figure 2:
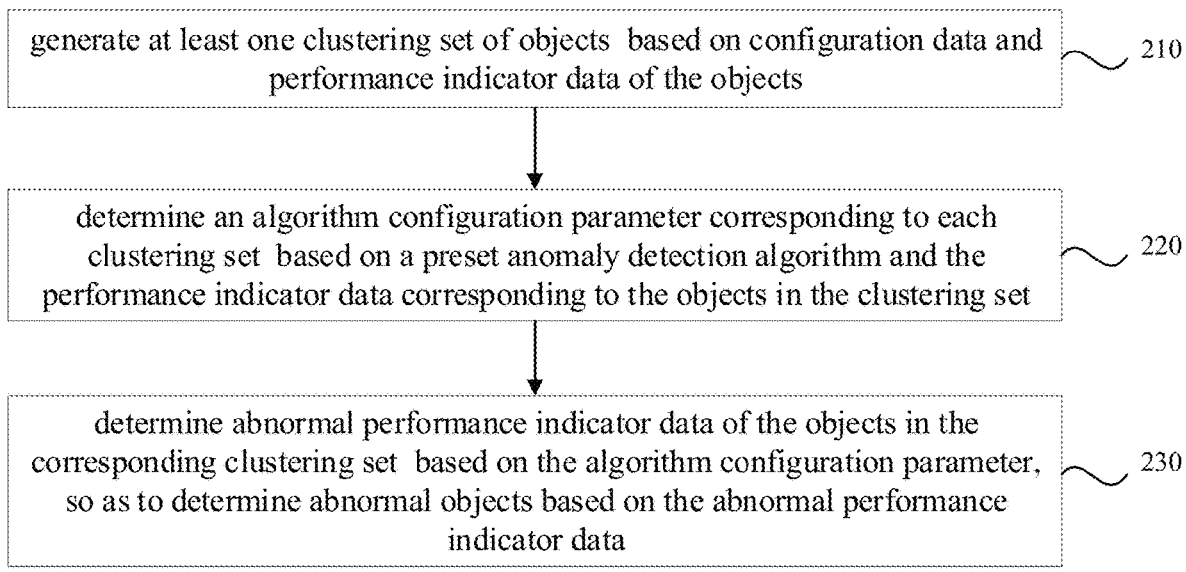
FIG. 2 is a flow chart of an anomaly detection method provided in an embodiment of the present application.

FIG. 2 is a flow chart of an anomaly detection method provided in the embodiment of the present application, and the method may be performed by an anomaly detection device. The device may be implemented by software and/or hardware and may generally be integrated in a network management system or exist independently of the network management system.

As shown in FIG. 2, the method provided in the embodiment of the present application includes following steps of S210 to S230.

In a step of S210, at least one clustering set of objects is generated based on configuration data and performance indicator data of the objects.

It should be noted that the objects include function modules for constructing a wireless communication network system. Taking the wireless communication network system in FIG. 1 as an example, the objects may be core networks, base stations, cells, terminals and transmission links. It can be understood that the objects are associated with the composition of the wireless communication network system, and will vary with the composition of the wireless communication network system.

In the embodiments of the present application, the configuration data may be attribute information of the object in terms of configuration. There are many types of configuration data, which are not specifically defined in the embodiments of the present application. For example, the configuration data may include configuration data related to spatial information. Alternatively, the configuration data may also include configuration data related to performance indicators. The type of configuration data may be determined based on the type of performance indicator data for anomaly detection, and then a corresponding type of configuration data may be selected for further processing. It can be understood that when there are a variety of performance indicator data to be subjected to anomaly detection, or the performance indicator data to be subjected to anomaly detection includes multiple indicators, it is necessary to select multiple types of configuration data. It should be noted that the configuration data is usually unchanged by the time the wireless communication network system is constructed and starts operating. Therefore, when the configuration data changes, it is necessary to re-acquire the configuration data of the objects in the wireless communication network system from the NMS.

In the embodiments of the present application, the performance indicator data may be data related to the performance indicator. Performance indicators are evaluation standards for monitoring network quality and performance. The performance indicators include PIs or KPIs specified by 3GPP, and may also include PIs or KPIs beyond the standards set by device manufacturers and operators themselves. It should be noted that the performance indicator data is related to the operation of the wireless communication network system, so it is necessary to acquire the performance indicator data periodically from the wireless communication network system. In some implementations, the acquisition cycle of the performance indicator data typically coincides with the reporting and updating cycle of the performance indicator data reported by network device. For example, the acquisition cycle is the same as the reporting and update cycle. Alternatively, there is an integer multiple relationship between the acquisition cycle and the reporting and updating cycle.

It should be noted that the clustering set is a set obtained by clustering the objects by comprehensively considering the characteristics of configuration data and performance indicator data corresponding to the objects. Since the performance indicator data is acquired periodically, at least one clustering set generated based on the performance indicator data of the current acquisition cycle contains objects that have similar performance indicator characteristics and fluctuation patterns in the current acquisition cycle. For example, the objects may be clustered based on the characteristics of the configuration data and performance indicator data, respectively, to obtain a sub-clustering set based on the configuration data and a sub-clustering set based on the performance indicator data. Considering the characteristics of the data in the two sub-clustering sets, logical operations are performed on the two sub-clustering sets to obtain at least one clustering set of the objects. The performance indicator data of the objects in the same clustering set have similar performance indicator characteristics and fluctuation patterns.

It should be noted that the performance indicator data is acquired periodically, and accordingly, the clustering sets are also generated periodically, and the generation cycle of the clustering sets is related to the acquisition cycle of the performance indicator data.

In a step of S220, an algorithm configuration parameter corresponding to each clustering set are determined based on a preset anomaly detection algorithm and the performance indicator data corresponding to the objects in the clustering set.

It should be noted that the preset anomaly detection algorithm is an algorithm for detecting abnormal objects based on the performance indicator data of the objects. There may be many types of anomaly detection algorithms, which are not specifically defined in the embodiments of the present application. For example, the anomaly detection algorithms may include low-pass filter type algorithms, density-based detection algorithms, clustering detection algorithms and support vector machine algorithms. The low-pass filter algorithm includes moving average or Kalman filter algorithm and its variants. The density-based detection algorithm includes a k-nearest neighbor or local outlier factor algorithm and its variants. The clustering detection algorithm includes a k-means clustering algorithm and its variants. The support vector machine algorithm includes a one-class support vector machine algorithm and its variants.

In the embodiments of the present application, the algorithm configuration parameter is a parameter required to enable the anomaly detection algorithm for anomaly detection. For example, the threshold for anomaly detection may be determined based on the algorithm configuration parameter. Since the algorithm configuration parameter correspond to each clustering set, the generation of different algorithm configuration parameters for the objects with different characteristics in different time intervals is implemented, which reduces the workload of manual analysis and parameter tuning in the field of performance indicator detection and improves the self-adaptability of the detection method.

In some embodiments, determining an algorithm configuration parameter corresponding to each clustering set based on a preset anomaly detection algorithm and the performance indicator data corresponding to the objects in the clustering set may include training the preset anomaly detection algorithm based on the performance indicator data of the objects in each clustering set, so as to obtain the algorithm configuration parameter corresponding to each clustering set. For example, based on a preset acquisition cycle, the performance indicator data is acquired. The currently acquired performance indicator data are cleaned and regularized to obtain sample data for training the preset anomaly detection algorithm. The sample data corresponds to the objects. A traversal is performed on the clustering sets, and the preset anomaly detection algorithm is trained by the sample data corresponding to the objects in each clustering set to obtain the algorithm configuration parameter applicable to each clustering set. For example, if six clustering sets are generated based on the configuration data and performance indicator data of the objects, the preset anomaly detection algorithm is trained based on the performance indicator parameters corresponding to the objects in the first clustering set to obtain the algorithm configuration parameter applicable to the first clustering set. Similarly, the preset anomaly detection algorithm is trained based on the performance indicator parameters corresponding to the objects in the second clustering set to obtain the algorithm configuration parameter applicable to the second clustering set. By analogy, the preset anomaly detection algorithm is trained based on the performance indicator parameters corresponding to the objects in the sixth clustering set to obtain the algorithm configuration parameter applicable to the sixth clustering set.

It should be noted that different preset anomaly detection algorithms are trained in different ways, and the specific training process is not specifically defined in the embodiments of the present application.

It should be noted that the clustering sets are generated periodically, and accordingly, the algorithm configuration parameter corresponding to each clustering set is also determined periodically, and the cycle of determining the algorithm configuration parameter is related to the cycle of generating the clustering sets.

In a step of S230, abnormal performance indicator data of the objects in the corresponding clustering set is determined based on the algorithm configuration parameter, so as to determine abnormal objects based on the abnormal performance indicator data.

It should be noted that the abnormal performance indicator data is performance indicator data with anomaly. The preset anomaly detection algorithm may be adopted to detect the presence of anomaly in the performance indicator data. Since the performance indicator data corresponds to the object, after the abnormal performance indicator data is detected, the object corresponding to the data, i.e., the abnormal object can be determined based on the abnormal performance indicator data.

In some embodiments, target performance indicator data corresponding to the objects in the clustering set to be detected is acquired. The target algorithm configuration parameter corresponding to the clustering set to be detected is determined. The anomaly detection is performed on the target performance indicator data based on the preset anomaly detection algorithm and the target algorithm configuration parameter, and the abnormal performance indicator data in the target performance indicator data is determined based on anomaly detection results to determine the object corresponding to the abnormal performance indicator data as an abnormal object.

It should be noted that, in a wireless network communication system, there may be a plurality of objects of the same type, and the plurality of objects may have different data characteristics, resulting in a plurality of clustering sets. Each clustering set may include at least one object. For example, the wireless network communication system includes 10 cells. The cells are clustered based on the configuration data and performance indicator data to obtain six clustering sets, and each clustering set contains two cells.

After the algorithm configuration parameter corresponding to each clustering set is determined, a clustering set of objects is randomly acquired as the clustering set to be detected. The object in the clustering set to be detected is determined, and the performance indicator data corresponding to the object is acquired as the target performance indicator data. The algorithm configuration parameter corresponding to the clustering set to be detected is acquired as the target algorithm configuration parameter. Based on the target algorithm configuration parameter, a preset anomaly detection algorithm is adopted to perform anomaly detection on the target performance indicator data, and the anomaly performance indicator data in the target performance indicator data is determined based on the anomaly detection results. The above operations are performed on the remaining clustering sets until all the objects in the clustering sets have been subjected to abnormal detection on the performance indicator data thereof. All objects corresponding to the abnormal performance indicator data in each clustering set are determined as abnormal objects.

It should be noted that the performance indicator data is acquired periodically, and accordingly, the abnormal objects in the clustering set are also determined periodically, and the determination cycle of the abnormal objects is related to the acquisition cycle of the performance indicator data.

An embodiment of the present application provides an anomaly detection method, including: clustering a plurality of objects based on configuration data and performance indicator data of the objects to obtain at least one clustering set; training a preset anomaly detection algorithm by the performance indicator data corresponding to each clustering set to obtain algorithm configuration parameter corresponding to each clustering set; and determining abnormal performance indicator data of the objects in the corresponding clustering set based on the preset abnormal detection algorithm and algorithm configuration parameter, so as to determine abnormal objects based on the abnormal performance indicator data. The above technical scheme makes full use of configuration data other than the performance indicator data, so that attributes of different components of the system can be grasped more accurately, the algorithm configuration parameter can be automatically adjusted, and the accuracy of detection and the self-adaptability of the detection method are improved.

In an implementation, generating at least one clustering set of the objects based on the configuration data and performance indicator data of the objects can be optimized as generating at least one clustering set of the objects based on the configuration data, performance indicator data and operation state data of the objects. The operation state data includes service quality data, measurement report, call tracing data, signaling tracing data, user complaint data or other data associated with the operation state of the objects. It can be understood that the operation state data may be one or more of the data listed above, which is not specifically defined in the embodiments of the present application. The operation state data of the objects can reflect the operation state of the objects, and generation of the clustering sets based on the configuration data, performance indicator data and operation state data of the objects allows to grasp the operation state and attributes of different objects in the wireless communication network system more accurately, realizing automatic adjustment of the algorithm configuration parameter for different systems, different objects, different time intervals and other factors.

In some embodiments, generating at least one clustering set of the objects based on the configuration data, performance indicator data and operation state data of the objects further includes following steps:

acquiring the configuration data of the objects, and clustering the objects based on the configuration data to generate a first clustering set of the objects;

acquiring the performance indicator data of the objects, and clustering the objects based on the performance indicator data to generate a second clustering set of the objects;

clustering the objects based on the operation state data to generate a third clustering set of the objects; and performing logical operations on the first clustering set, the second clustering set and the third clustering set based on a preset rule to obtain at least one clustering set of the objects.

It should be noted that the configuration data is usually unchanged by the time the wireless communication network system is constructed and starts operating. Therefore, in the subsequent anomaly detection process, if the configuration data is still unchanged, the configuration data of the objects is acquired, and the objects are clustered based on the configuration data. The operation of generating the first clustering set of the objects is only performed once. If the configuration data changes, it is necessary to acquire the configuration data again, and cluster the objects based on the newly acquired configuration data to generate a new first clustering set.

Figure 3:
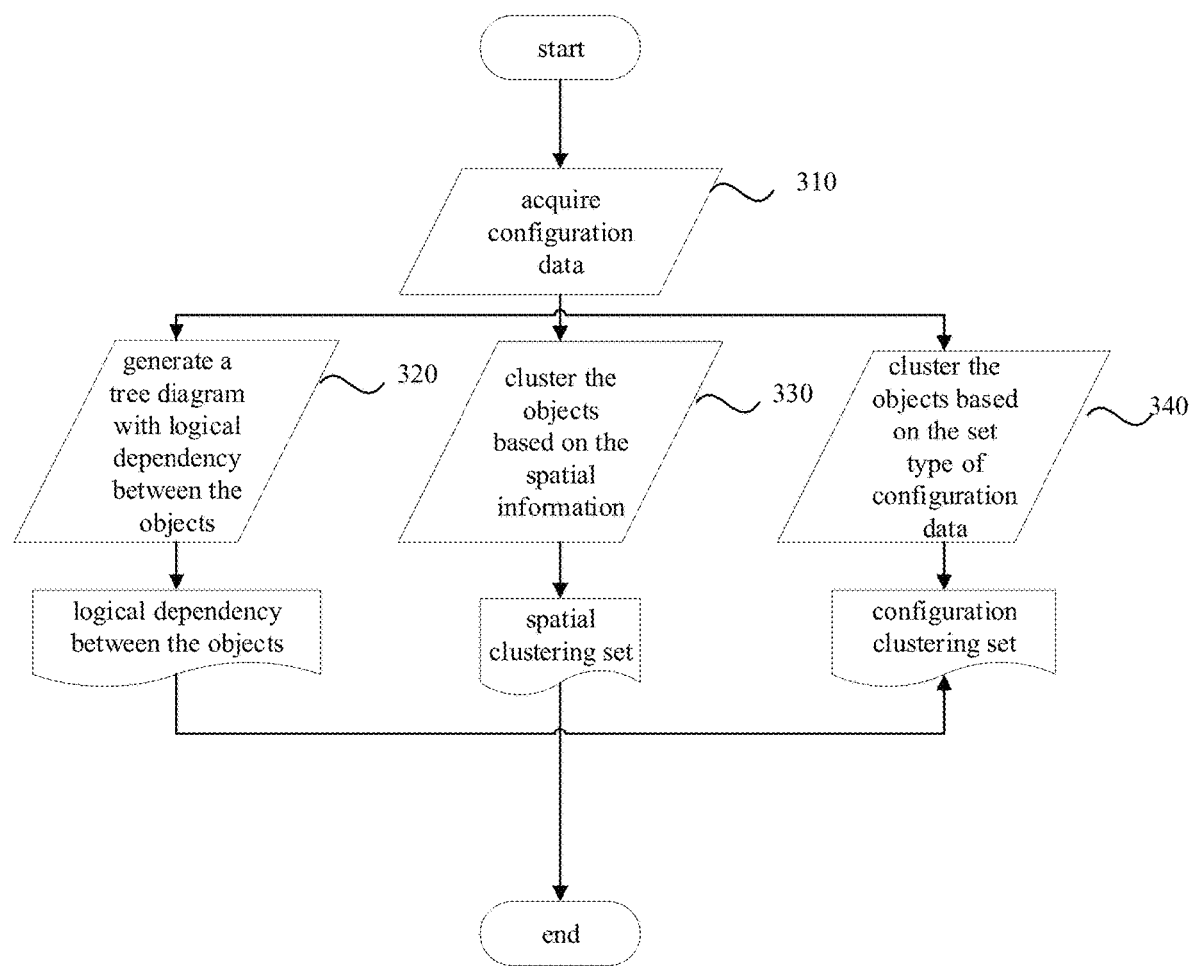
FIG. 3 is a processing flow chart of configuration data in the anomaly detection method provided in the embodiment of the present application.

FIG. 3 is a processing flow chart of the configuration data in the anomaly detection method provided in the embodiment of the present application. As shown in FIG. 3, the processing flow of acquiring configuration data of the objects and clustering the objects based on the configuration data to generate a first clustering set of the objects includes following steps 310 to 340.

In a step of S310, the NMS acquires the configuration data of the wireless network management system, and cleans and regularizes the configuration data acquired.

It should be noted that the configuration data is cleaned to remove duplicate data and error data. The configuration data is regularized to clean, transform, merge and reshape the data.

In a step of S320, a logical dependency between the objects in the wireless communication network system is determined based on the configuration data.

It should be noted that the logical dependency refers to the logical connection between different objects. For example, a base station may correspond to a plurality of cells. At this moment, there is a logical dependency between the cells and the base station. It may be considered that the base station is a parent object of the cells while the cells are a child object of the base station. Alternatively, there is a logical transmission link between each cell and its base station, and a physical transmission link between each base station and a core network. In terms of the same base station, the physical transmission link is the parent object of the logical transmission link, while the logical transmission link is the child object of the physical transmission link.

In general, the logical dependency of the objects in the wireless network communication system presents a tree structure.

In a step of S330, the objects are clustered based on the configuration data related to spatial information to obtain a spatial clustering set of the objects clustered based on the spatial information.

In the embodiment of the present application, the configuration data related to the spatial information refers to the data that carries one of the attributes of spatial information in the configuration data. For example, the spatial information may be a geographical location and so on.

In a step of S340, the objects are clustered based on the set type of configuration data to obtain a configuration clustering set of the objects clustered based on the set type of configuration data.

It should be noted that the type of configuration data selected for clustering depends on the KPI or PI indicators for which anomaly detection is performed. For example, if the indicators to be subjected to anomaly detection are those related to radio frequency, the configuration parameters related to radio frequency are selected for clustering. Alternatively, if the indicators to be subjected to anomaly detection are those related to calls, the configuration parameters related to calls are selected for clustering. In some implementations, there may be a plurality of configuration clustering sets obtained by clustering configuration data of different types at the same time.

It should be noted that the first clustering set obtained by clustering the configuration data includes the spatial clustering set in the step 330 and the configuration clustering set in the step 340.

It should be noted that step 320, step 330, and step 340 are not required to be performed in a specific order, and they may be performed in the order described in the above examples, or in a reverse order or may be performed simultaneously.

Figure 4:
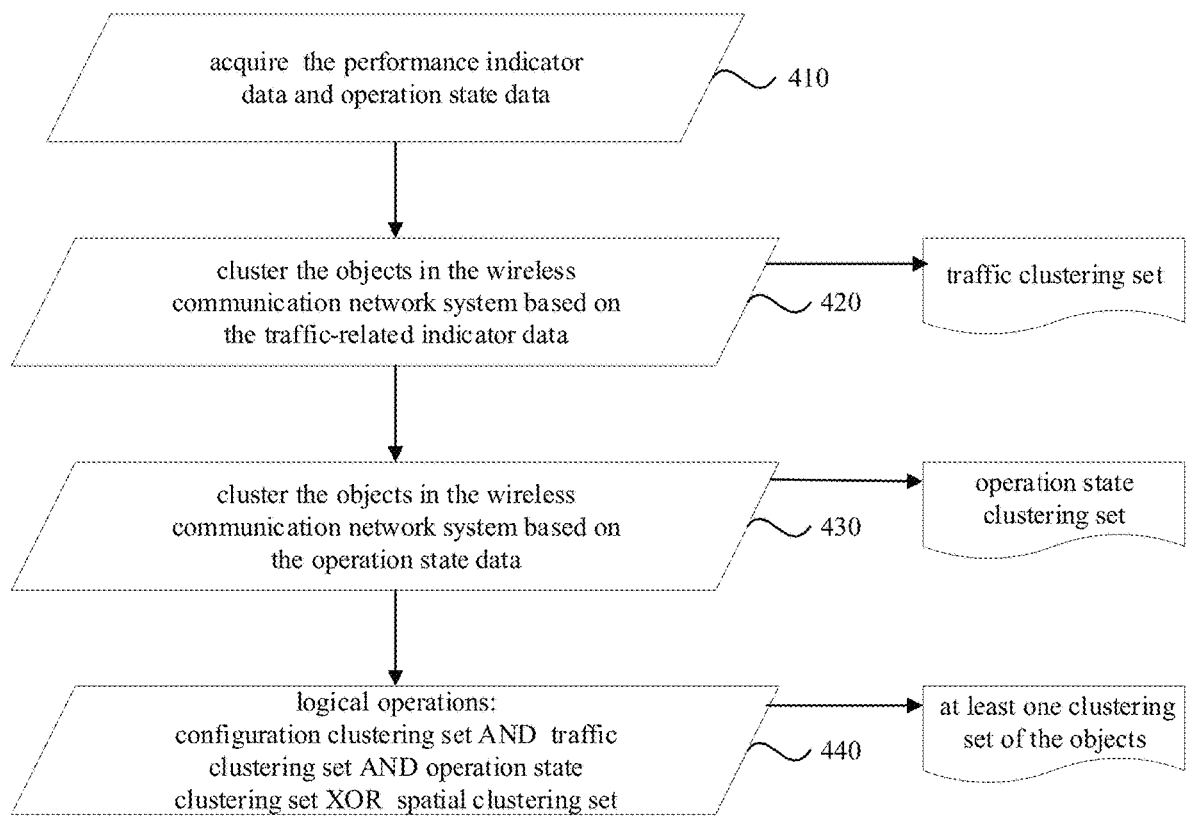
FIG. 4 is a processing flow chart of determining a clustering set in the anomaly detection method provided in the embodiment of the present application.

FIG. 4 is a processing flow chart of determining a clustering set in the anomaly detection method provided in the embodiment of the present application. As shown in FIG. 4, the processing flow of acquiring performance indicator data of the objects, and clustering the objects based on the performance indicator data to generate a second clustering set of the objects; clustering the objects based on the operation state data to generate a third clustering set of the objects; and performing logical operations on the first clustering set, the second clustering set and the third clustering set based on a preset rule to obtain at least one clustering set of the objects includes following steps of S410 to S440.

In a step of S410, the performance indicator data and operation state data of the objects are acquired periodically, and the performance indicator data and operation state data are cleaned and regularized, respectively.

In the embodiments of the present application, the acquisition cycle of the performance indicator data and operation state data is determined based on the reporting cycle of the above data. For example, assuming that the reporting cycle of the performance indicator data or operation state data in the wireless network communication system is x minutes, the acquisition cycle of the performance indicator data and operation state data of the acquired objects in the embodiments of the present application may also be x minutes. In some implementations, the acquisition cycle may also be an integer multiple of the reporting cycle according to the needs of the actual usage scenario, which is not specifically defined in the embodiments of the present application.

In the embodiments of the present application, the operation state data includes data such as call detail records, complaint records, measurement reports (MR) or Call Detail Trace (CDT) of users. The performance indicator data includes traffic-related indicator data. The traffic-related indicator data may be data corresponding to indicators such as traffic data volume or switching times.

In a step of S420, the objects in the wireless communication network system are clustered based on the traffic-related indicator data to obtain a traffic clustering set clustered based on the traffic-related indicator data.

It should be noted that, since the traffic belongs to the performance indicator, the traffic clustering set obtained by clustering the objects based on the traffic-related indicator data belongs to the second clustering set obtained by clustering the objects based on the performance indicator data.

In a step of S430, the objects in the wireless communication network system are clustered based on the operation state data to obtain an operation state clustering set clustered based on the operation state data.

It should be noted that the operation state clustering set belongs to the third clustering set.

In a step of S440, logical operations are performed on the spatial clustering set, the configuration clustering set, the traffic clustering set and the operation state clustering set based on the preset rule to obtain at least one clustering set of the objects.

In the embodiments of the present application, the preset rule is limiting information that limits the logical operator or operational order of the logical operation. Logical operations, which are performed on the spatial clustering set, the configuration clustering set, the traffic clustering set, and the operation state clustering set based on different preset rules, may lead to different results. The preset rule to be selected may be determined based on the target of anomaly detection. For example, the preset rule may be the configuration clustering set AND the traffic clustering set AND the operation state clustering set XOR the spatial clustering set, where AND is a logical operator that represents an AND operation, and XOR is a logical operator that represents an exclusive OR operation. Logical operations, which are performed on the spatial clustering set, the configuration clustering set, the traffic clustering set, and the operation state clustering set based on the above preset rule, result in that objects with similar configurations, traffic and operation state but different spatial positions are included in one clustering set. For another example, the preset rule may be the configuration clustering set AND the spatial clustering set AND the operation state clustering set XOR the traffic clustering set. Logical operations, which are performed on the spatial clustering set, the configuration clustering set, the traffic clustering set, and the operation state clustering set based on the above preset rule, result in that objects with similar configuration, operation state and spatial position but different traffic are included in one clustering set. For another example, the preset rule may be the configuration clustering set AND the traffic clustering set AND the operation state clustering set AND the spatial clustering set. Logical operations, which are performed on the spatial clustering set, the configuration clustering set, the traffic clustering set, and the operation state clustering set based on the above preset rule, result in that objects with similar configurations, traffic and operation state and the same spatial position are included in one clustering set.

Figure 5:
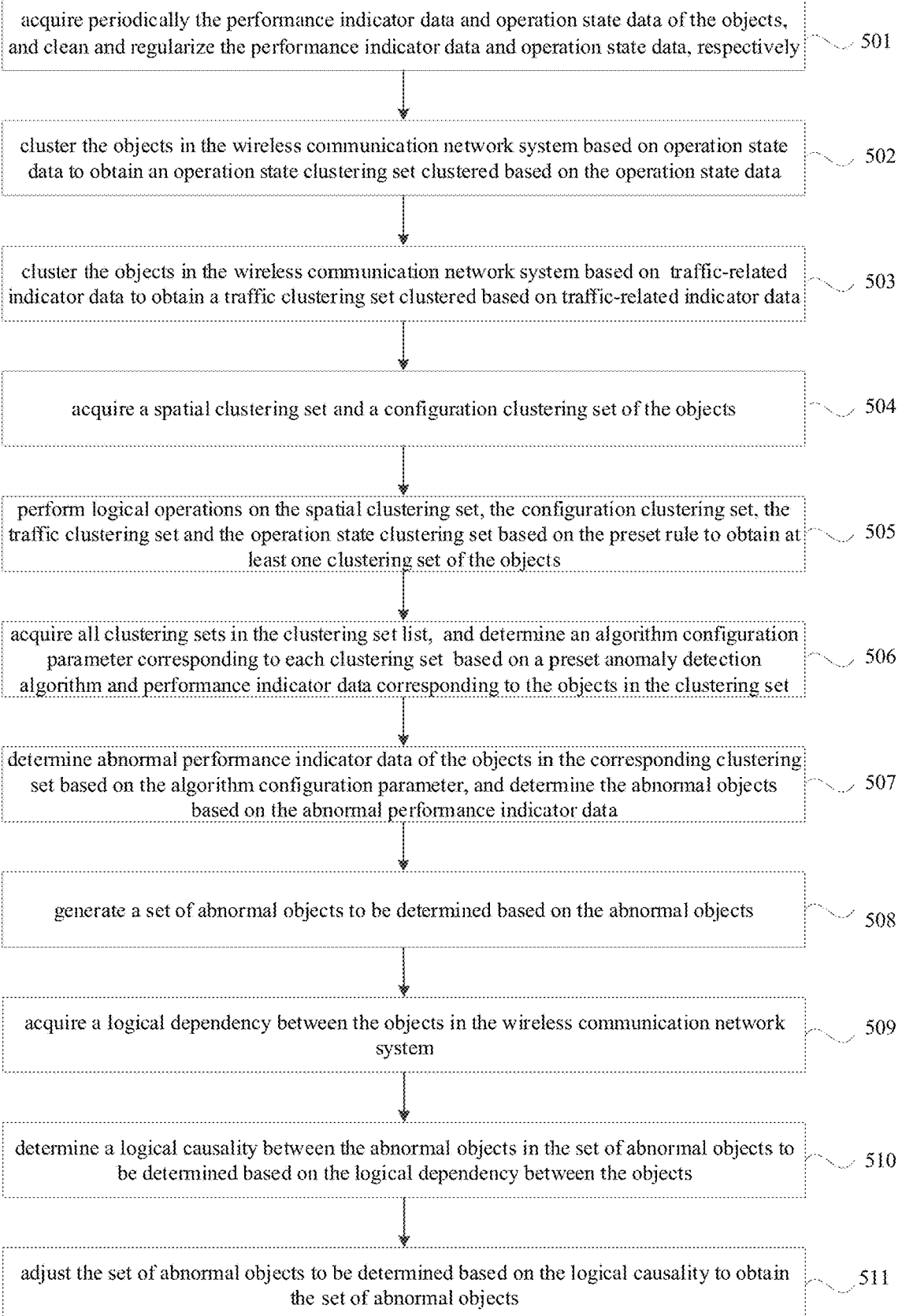
FIG. 5 is a flow chart of another anomaly detection method provided in the embodiment of the present application.

FIG. 5 is a flow chart of another anomaly detection method provided in the embodiment of the present application. As shown in FIG. 5, the anomaly detection method includes following steps of S501 to S511.

In a step of S501, the performance indicator data and operation state data of the objects are acquired periodically, and the performance indicator data and operation state data are cleaned and regularized, respectively.

In a step of S502, the objects in the wireless communication network system are clustered based on the operation state data to obtain an operation state clustering set clustered based on the operation state data.

In a step of S503, the objects in the wireless communication network system are clustered based on the traffic-related indicator data to obtain a traffic clustering set clustered based on the traffic-related indicator data.

In a step of S504, a spatial clustering set and a configuration clustering set of the objects are acquired.

In a step of S505, logical operations are performed on the spatial clustering set, the configuration clustering set, the traffic clustering set and the operation state clustering set based on the preset rule to obtain at least one clustering set of the objects.

In some implementations, at least one clustering set of the objects may be stored in a list, and the list storing at least one clustering set is called a clustering set list.

In a step of S506, all clustering sets in the clustering set list are acquired, and an algorithm configuration parameter corresponding to each clustering set are determined based on a preset anomaly detection algorithm and the performance indicator data corresponding to the objects in the clustering set.

In the embodiments of the present application, the algorithm configuration parameter include a configuration parameter or a threshold required by the anomaly detection algorithm. It should be noted that which algorithm is selected as the preset anomaly detection algorithm is determined based on the actual application scenario, which is not specifically defined in the embodiments of the present application. In some implementations, the objects in different states may be classified through the above logical operations, thus simplifying the application scenario, and a relatively simple anomaly detection algorithm such as Vector Auto Regression (VAR) may be selected.

In a step of S507, abnormal performance indicator data of the objects in the corresponding clustering set is determined based on the algorithm configuration parameter, and the abnormal objects are determined based on the abnormal performance indicator data. In some embodiments, based on the algorithm configuration parameter corresponding to each clustering set determined in the above steps, a preset anomaly detection algorithm is adopted to perform anomaly detection on the performance indicator data of the objects in each clustering set to obtain abnormal performance indicator data. Based on the corresponding relationship between the performance indicator data and the objects, abnormal objects corresponding to the abnormal performance indicator data are determined.

In a step of S508, a set of abnormal objects to be determined is generated based on the abnormal objects.

In a step of S509, a logical dependency between the objects in the wireless communication network system is acquired.

In a step of S510, a logical causality between the abnormal objects in the set of abnormal objects to be determined is determined based on the logical dependency between the objects.

Figure 6:
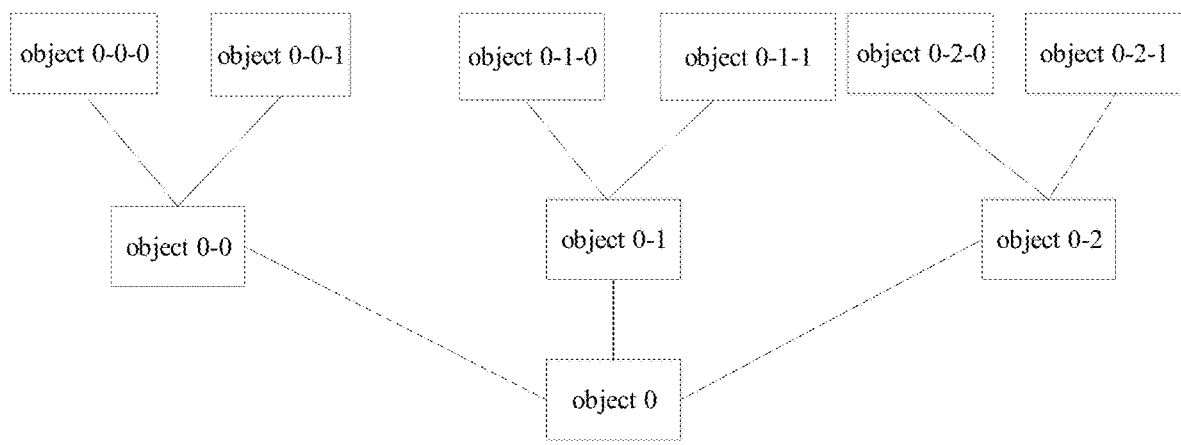
FIG. 6 is a schematic diagram of a logical dependency between objects provided in the embodiment of the present application.

FIG. 6 is a schematic diagram of a logical dependency between objects provided in the embodiment of the present application. As shown in FIG. 6, object 0 has a logical dependency with three other types of objects (i.e., objects 0-0, 0-1 and 0-2), where the object 0-0 has a logical dependency with object 0-0-0 and object 0-0-1, respectively; the object 0-1 has a logical dependency with object 0-1-0 and object 0-1-1, respectively; and the object 0-2 has a logical dependency with object 0-2-0 and object 0-2-1, respectively.

In a step of S511, the set of abnormal objects to be determined is adjusted based on the logical causality to obtain the set of abnormal objects.

In some embodiments, based on the logical dependency between objects, an abnormal object and an object having a logical dependency with the abnormal object (the object at a parent node) are acquired by performing a traversal downward from a topmost child node, to determine whether the abnormal object and the object at the parent node have similar anomalies in performance indicators. If so, the abnormal object as a child node is deleted from the set of abnormal objects to be determined. Otherwise, no operation is performed. In the case that there are still abnormal objects on which the traversal has not been performed in the clustering set, new abnormal objects are acquired and the above process is repeated. In the case that a traversal has been performed on the abnormal objects in all clustering sets in the clustering set list, the adjusted set of abnormal objects to be determined will be taken as a final set of abnormal objects.

Figure 7:
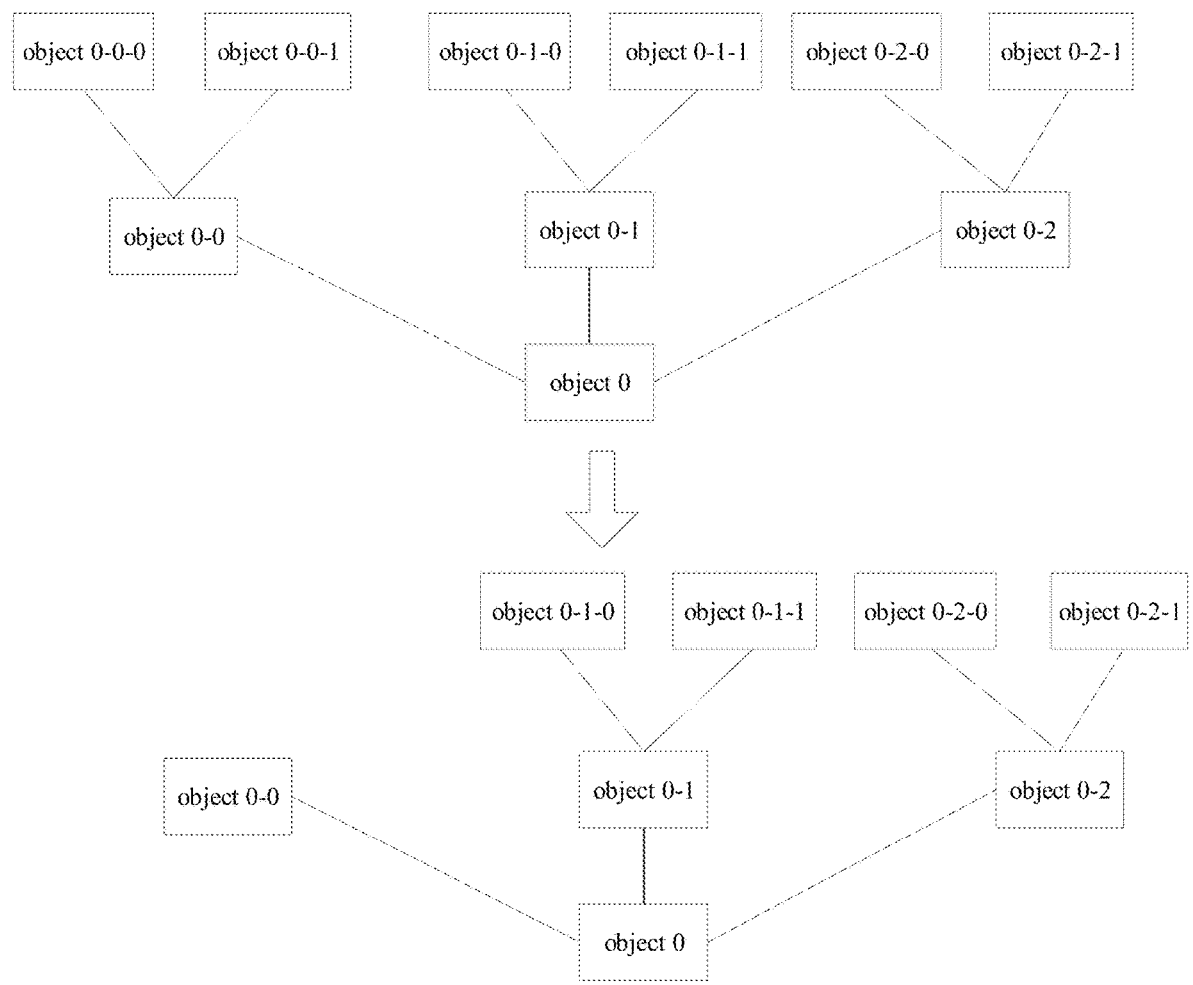
FIG. 7 is a schematic diagram of attribution reduction of abnormal objects provided in the embodiment of the present application.

FIG. 7 is a schematic diagram of attribution reduction of abnormal objects provided in the embodiment of the present application. As shown in FIG. 7, objects 0-0, 0-0-0 and 0-0-1 have similar performance anomalies, and the object 0-0 is an object at the parent node, while the objects 0-0-0 and 0-0-1 are both objects at the child nodes. The anomaly of the object at the child node is probably caused by the object at the parent node, so the objects 0-0-0 and 0-0-1 may be deleted from the set of abnormal objects to be determined.

With the above scheme, when the objects at the child node have similar anomalies with those at the parent node based on the logical dependency between the objects, the anomalies of the objects at the child node are attributed to those at the parent node, so that the attribution reduction of abnormal objects is achieved, redundant data contained in the set of abnormal objects is reduced, and the accuracy of abnormal object detection is improved.

Figure 8:
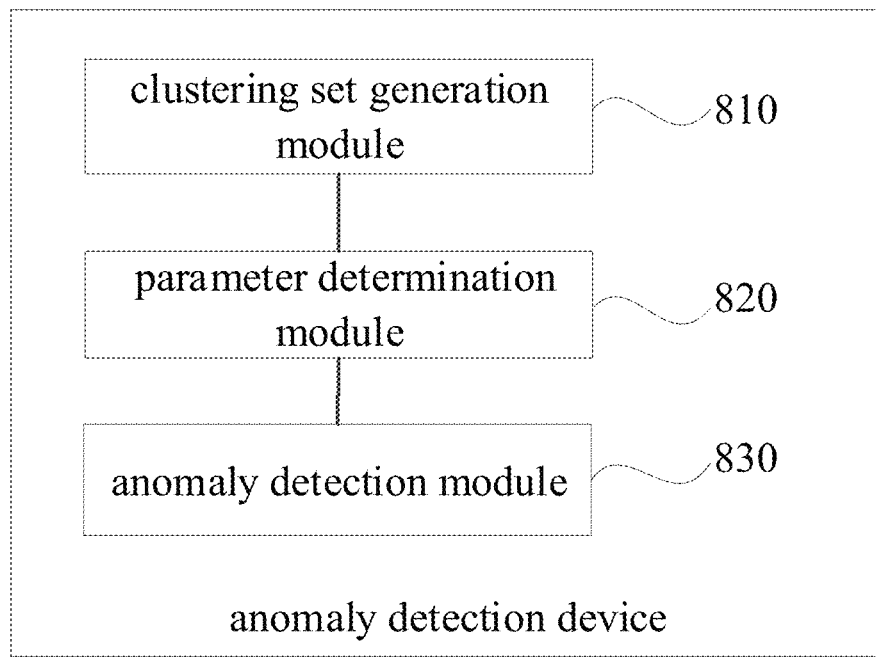
FIG. 8 is a schematic structural block diagram of an anomaly detection device provided in the embodiment of the present application.

FIG. 8 is a schematic structural block diagram of an anomaly detection device provided in the embodiment of the present application. The device may be configured in the NMS, and may also exist independently of the NMS. By performing the anomaly detection method provided in the embodiment of the present application, the device can accurately detect abnormal objects in a wireless communication network system. As shown in FIG. 8, the anomaly detection device in the embodiment of the present application includes a clustering set generation module 810, a parameter determination module 820, and an anomaly detection module 830.

The clustering set generation module 810 is configured to generate at least one clustering set of objects based on configuration data and performance indicator data of the objects.

The parameter determination module 820 is configured to determine an algorithm configuration parameter corresponding to each clustering set based on a preset anomaly detection algorithm and the performance indicator data corresponding to the objects in the clustering set.

The anomaly detection module 830 is configured to determine abnormal performance indicator data of the objects in the corresponding clustering set based on the algorithm configuration parameter, so as to determine abnormal objects based on the abnormal performance indicator data.

The anomaly detection device provided in the embodiment of the present application is configured to implement the anomaly detection method in the embodiment shown in FIG. 2, and the implementation principle and technical effect of the anomaly detection device are similar to those of the anomaly detection method, which will not be described in detail here.

In one example, the object includes function modules for constructing the wireless communication network system.

In one example, the clustering set generation module 810 is configured to: generate at least one clustering set of the objects based on configuration data, performance indicator data and operation state data of the objects.

In one example, the operation state data includes one or more of service quality data, measurement report, call tracing data, signaling tracing data and user complaint data.

In one example, the clustering set generation module 810 is configured to:
  acquire the configuration data of the objects, and cluster the objects based on the configuration data to generate a first clustering set of the objects;
  acquire the performance indicator data of the objects, and cluster the objects based on the performance indicator data to generate a second clustering set of the objects;
  acquire the operation state data of the objects, and cluster the objects based on the operation state data to generate a third clustering set of the objects, where the operation state data includes service quality data, measurement report, call tracing data, signaling tracing data or user complaint data; and
  perform logical operations on the first clustering set, the second clustering set and the third clustering set based on a preset rule to obtain at least one clustering set of the objects.

In one example, the parameter determination module 820 is configured to:
  train the preset anomaly detection algorithm based on the performance indicator data of the objects in each clustering set to obtain the algorithm configuration parameter corresponding to each clustering set.

In one example, the anomaly detection module 830 is configured to:
  acquire target performance indicator data corresponding to the objects in the clustering set to be detected;
  determine a target algorithm configuration parameter corresponding to the clustering set to be detected; and
  perform anomaly detection on the target performance indicator data based on the preset anomaly detection algorithm and the target algorithm configuration parameter, and determine abnormal performance indicator data in the target performance indicator data based on anomaly detection results.

In one example, the anomaly detection device further includes a set adjustment module.

The set adjustment module is configured to, after determining an abnormal object based on the abnormal performance indicator data, generate a set of abnormal objects to be determined based on the abnormal objects; acquire a dependency between the objects in the wireless communication network system, where the dependency is determined based on the configuration data; determine a logical causality between the abnormal objects in the set of abnormal objects to be determined based on the dependency between the objects; and adjust the set of abnormal objects to be determined based on the logical causality to obtain a set of abnormal objects.

Figure 9:
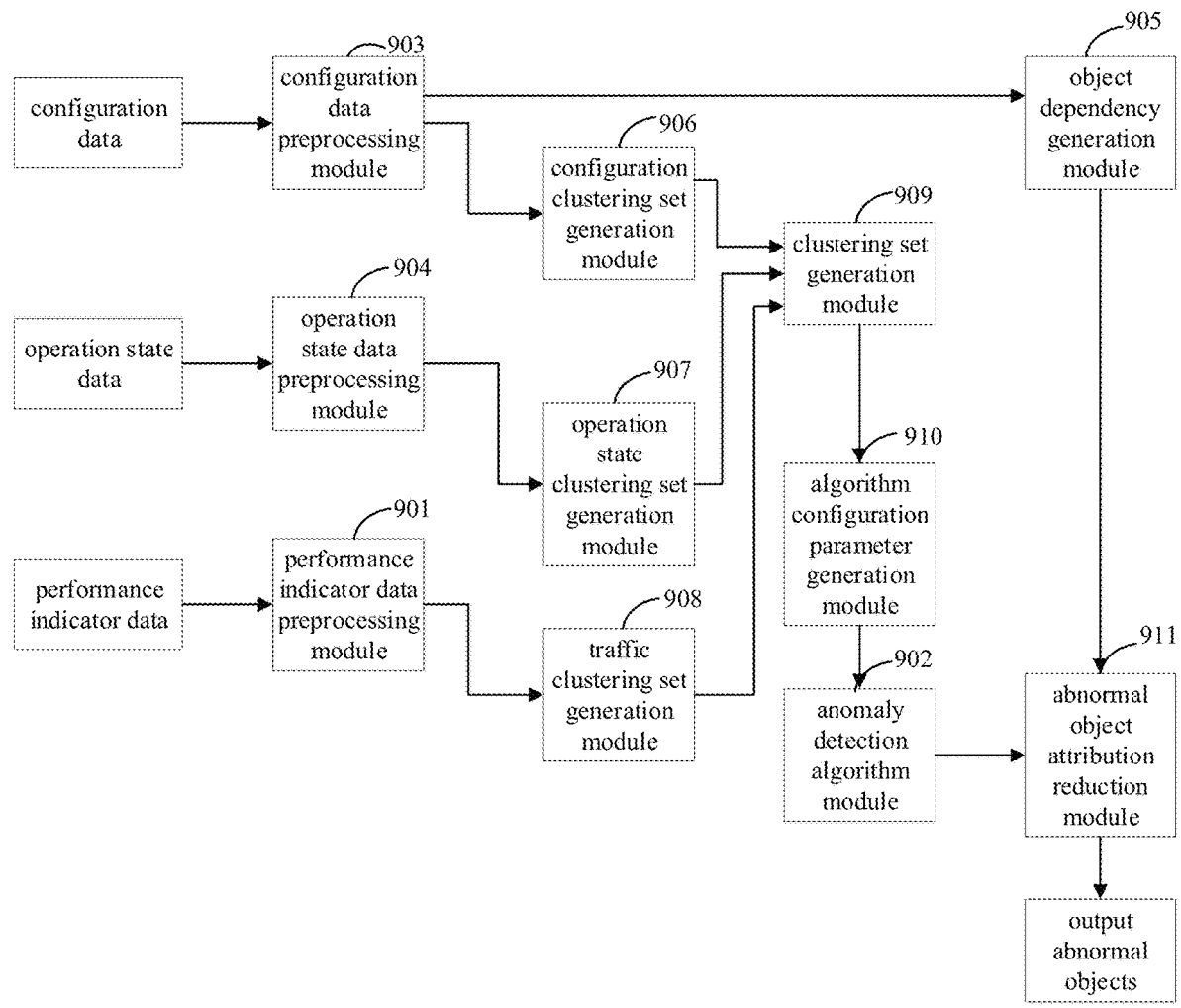
FIG. 9 is a processing flow diagram of another anomaly detection device provided in the embodiment of the present application.

FIG. 9 is a processing flow diagram of another anomaly detection device provided in the embodiment of the present application. In an implementation, the anomaly detection device may include a performance indicator data preprocessing (loading, cleaning and regularization) module 901, an anomaly detection algorithm module 902, a configuration data preprocessing (loading, cleaning and regularization) module 903, an operation state data preprocessing (loading, cleaning and regularization) module 904, an object dependency generation module 905, a configuration clustering set generation module 906, an operation state clustering set generation module 907, a traffic clustering set generation module 908, a clustering set generation module 909, an algorithm configuration parameter generation module 910 and an abnormal object attribution reduction module 911.

The performance indicator data preprocessing module 901 is configured to read performance indicator data, clean and regularize the data, and send the cleaned and regularized data to the anomaly detection algorithm module 902 and the traffic clustering set generation module 908, respectively.

The configuration data preprocessing module 903 is configured to read configuration data of a wireless communication network system, clean and regularize the data, and send the cleaned and regularized data to the object dependency generation module 905 and the configuration cluster generation module 906, respectively.

The operation state data preprocessing module 904 is configured to read operation state data of objects in the wireless communication network system, clean and regularize the data, and send the cleaned and regularized data to the operation state clustering set generation module 907.

The object dependency generation module 905 is configured to generate a logical dependency between the objects based on the configuration data, and send the logical dependency to the abnormal object attribution reduction module 911.

The configuration clustering set generation module 906 is configured to cluster the objects based on the configuration data to obtain a configuration clustering set and a spatial clustering set of the objects, and send the configuration clustering set and the spatial clustering set to the clustering set generation module 909.

The operation state clustering set generation module 907 is configured to cluster the objects based on the operation state data to obtain an operation state clustering set of the objects, and send the operation state clustering set to the clustering set generation module 909.

The traffic clustering set generation module 908 is configured to cluster the objects based on the traffic to obtain a traffic clustering set of the objects, and send the traffic clustering set to the clustering set generation module 909.

The clustering set generation module 909 is configured to perform logical operations on the spatial clustering set, the configuration clustering set, the traffic clustering set and the operation state clustering set based on the preset rule to obtain at least one clustering set of the objects. In some implementations, at least one clustering set of the objects may be stored in a clustering set list. The clustering set generation module 909 sends the clustering set list to the algorithm configuration parameter generation module 910.

The algorithm configuration parameter generation module 910 is configured to generate an algorithm configuration parameter for each clustering set based on a preset anomaly detection algorithm and the performance indicator data corresponding to the objects in the clustering set list, and send the parameter to the anomaly detection algorithm module 902.

The anomaly detection algorithm module 902 is configured to perform anomaly detection on the performance indicator data in the corresponding clustering set based on the algorithm configuration parameter corresponding to each clustering set, generate a set of anomaly objects to be determined, and send the set to the anomaly object attribution reduction module 911.

The abnormal object attribution reduction module 911 is configured to determine a logical causality between the abnormal objects in the set of abnormal objects to be determined based on the logical dependency of the objects, determine target abnormal objects that meets a setting rule in the set of abnormal objects to be determined based on the logical causality, delete the target abnormal objects to obtain a set of abnormal objects, and output the set of abnormal objects.

Figure 10:
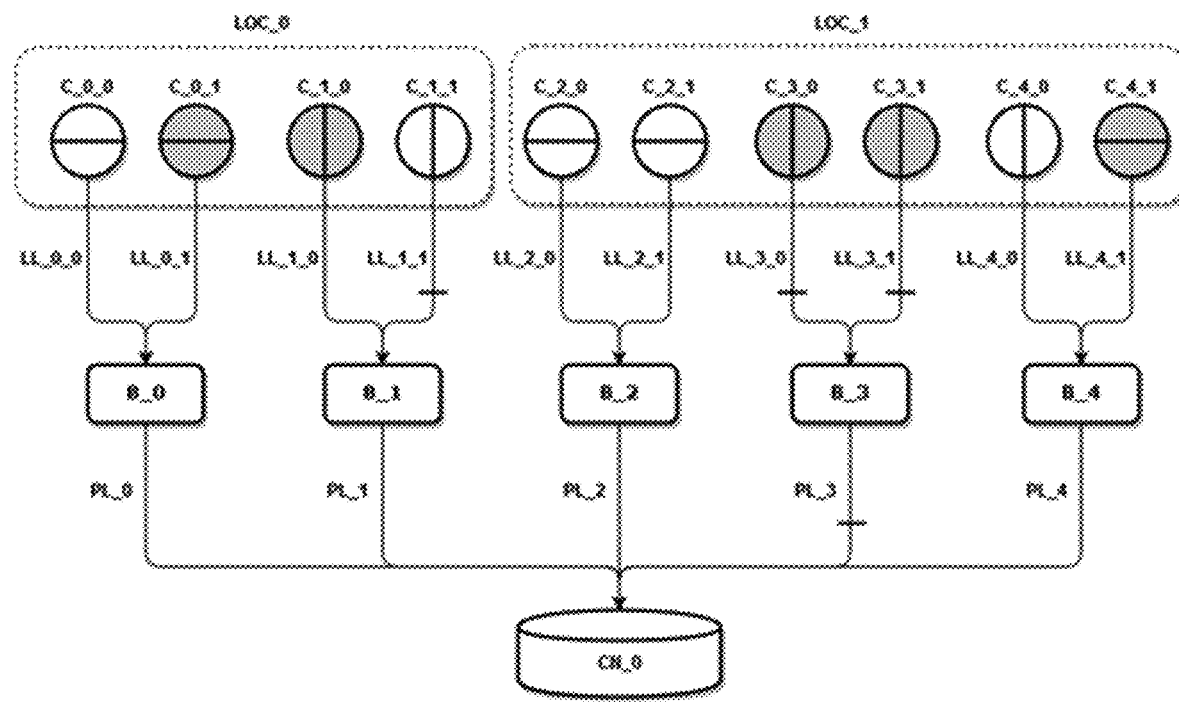
FIG. 10 is a schematic diagram of a wireless communication network system provided in the embodiment of the present application.

For ease of understanding, a processing flow of the anomaly detection method in the embodiments of the present application is described by following examples. FIG. 10 is a schematic diagram of a wireless communication network system provided in the embodiment of the present application. Assuming that there is a simplified wireless communication network system, as shown in FIG. 10, the wireless communication network system includes a core network and five base stations.

1) The core network is numbered as: CN_0.
2) Five base stations are numbered as: B_0-B_4.
3) Each base station manages 2 cells (10 cells in total), and the cells are numbered as: C_0_0-C_4_1, where the second digit is the base station number (0-4) to which the cell belongs, and the third digit is the cell number (0-1).
4) There is a logical transmission link between each cell and the base station, numbered as: LL-0_0-LL_4_1.
5) There is a physical transmission link between each base station and CN, numbered as: PL_0-PL_4.
6) It is assumed that the 10 cells mainly cover two geographical locations: LOC_0-LOC_1, where four cells under the management of B_0 and B_1 cover LOC_0, and six cells under the management of B_2, B_3 and B_4 cover LOC_1.
7) It is assumed that there are a total of two different wireless parameter configurations in these cells, which are represented by a circle containing a horizontal line and a circle containing a vertical line in the figure.
8) It is assumed that some cells represented by a gray background in the figure are currently in a high traffic state, and that some cells represented by a white background in the figure are in a low traffic state.

9) It is assumed that the current operation transition data is only call detail record data of users, which is basically the same for all cells.

The implementation process of the anomaly detection method in the embodiment of the present application will be described based on the above assumptions.

1. The configuration data preprocessing module first acquires configuration data, cleans and regularizes the data, and generates a dependency diagram of objects. At this time, the anomaly detection device has learned which objects are included in the wireless network communication system and the parent-child dependency between the objects, and kept the dependency data for future use. The processed configuration data is then sent to the configuration cluster generation module.

2. The configuration cluster generation module operates the configuration data related to spatial information based on DBSCAN clustering algorithm, so as to obtain a cell clustering set clustered based on geographical locations and a cell clustering set clustered based on wireless parameter configurations.

3. The cells in the wireless communication network system are clustered based on the geographical location to obtain two spatial clustering sets:
LOC_1: [C_0_0,C_0_1,C_1_0,C_1_1]
LOC_2: [C_2_0,C_2_1,C_3_0,C_3_1,C_4_0,C_4_1]
The cells in the wireless communication network system are clustered based on the wireless configurations to obtain two configuration clustering sets:
a. [C_0_0,C_0_1,C_2_0,C_2_1,C_4_1]
b. [C_1_0,C_1_1,C_3_0,C_3_1,C_4_0]
The data is kept for future use.

4. The performance indicator data preprocessing module reads the performance indicator data reported by the system, cleans and regularizes the data, and then sends the data to the traffic clustering set generation module while caching the data and then providing the data for the anomaly detection algorithm module after the anomaly detection algorithm module is ready.

5. The operation state data preprocessing module reads the operation state data reported by the system (the data is the call detail record of users in this case), cleans and regularizes the data, and then sends the data to the operation state clustering set generation module.

6. The traffic clustering set generation module operates the received performance indicator data based on DBSCAN clustering algorithm to obtain a cell clustering set clustered based on the traffic.

7. The operation state clustering set generation module operates the received operation state data based on the DBSCAN clustering algorithm to obtain a cell clustering set clustered based on the operation state data.

8. The cells in the wireless communication network system are clustered based on the traffic to obtain two traffic clustering sets:
high traffic: [C_0_1,C_1_0,C_3_0,C_3_1,C_4_1]
low traffic: [C_0_0,C_1_1,C_2_0,C_2_1,C_4_0]
The cells in the wireless communication network system are clustered based on the operation state data to obtain an operation state clustering set, which includes all cells. The data is kept for future use.

9. The clustering set generation module may obtain a clustering set list through set operations based on the cluster data obtained in the steps 3 and 8, including the wireless configuration clustering set AND the operation state clustering set AND the traffic volume clustering set XOR the spatial clustering set, so that all clustering sets of cells with similar wireless configurations, operation states and traffic but different geographical positions may be obtained.

10. The final clustering set list of the cells is as follows:
a. [C_0_0, C_2_0]
b. [C_0_0, C_2_1]
c. [C_0_1, C_4_1]
d. [C_1_0, C_3_0]
e. [C_1_0, C_3_1]
f. [C_1_1, C_4_0]
The data is sent to the algorithm configuration parameter generation module.

11. The algorithm configuration parameter generation module trains, through vector autoregressive approach, the cell performance indicator data in each clustering set grouped based on the obtained clustering set list, so as to obtain algorithm configuration parameter applicable to this group. Once the algorithm configuration has been calculated for all the clustering sets in the clustering set list, the algorithm configuration parameter of each clustering set are transferred to the anomaly detection algorithm module.

12. The anomaly detection algorithm module acquires the performance indicator data from the performance indicator data preprocessing module, as well as the clustering set list and the algorithm configuration parameter applicable to each clustering set from the algorithm configuration parameter generation module, and then performs anomaly detection on the cells in each clustering set through the vector autoregressive algorithm. After all clustering sets are detected, a set of abnormal objects to be determined is output to the abnormal object attribution reduction module.

13. The abnormal object attribution reduction module performs attribution reduction on the set of abnormal objects to be determined through the dependency diagram of objects obtained in the step 1. For example, referring to FIG. 10, the anomaly detection algorithm shows that LL_1_1, LL_3_0, LL_3_1 and PL_3 have similar anomalies in the indicator of packet loss probability. Based on the dependency between the objects, the abnormal object attribution reduction module determines that neither the objects at the nodes adjacent to LL_1_1 nor the object at the parent node of LL_1_1 have anomalies, so the anomalies are only limited to LL_1_1 itself and it is not necessary to reduce the objects. However, PL_3 is an abnormal parent node, and all its child nodes have similar anomalies, so the anomalies of the child nodes are probably caused by the parent node. Therefore, it is decided to reduce all the child nodes, leaving only the abnormal object of PL_3. At this point, the attribution reduction is finished, and the set of abnormal objects is obtained.

14. The set of abnormal objects is output.

Figure 11:
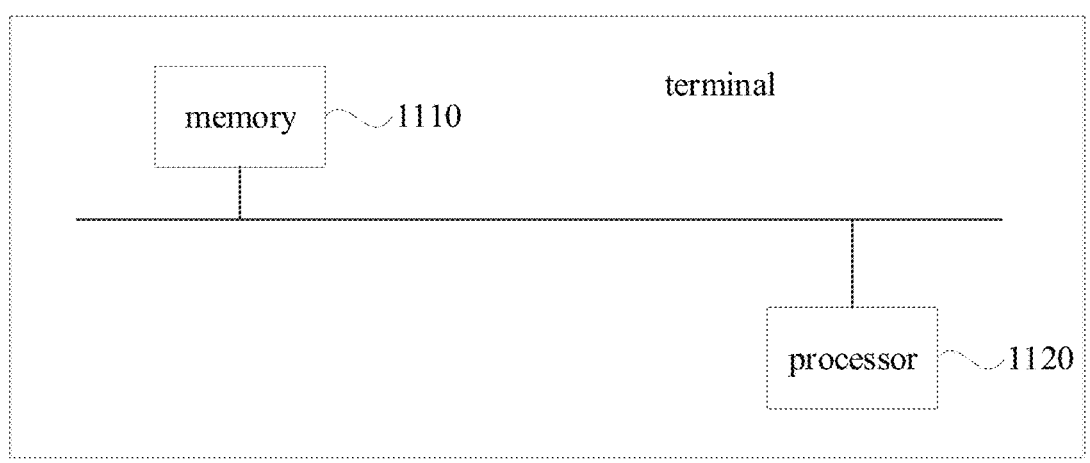
FIG. 11 is a structure diagram of a terminal provided in the embodiment of the present application.

An embodiment of the present application provides a terminal. FIG. 11 is a structure diagram of the terminal provided in the embodiment of the present application. As shown in FIG. 11, the terminal includes a memory 1110 and one or more processors 1120. The memory 1110 is configured to store one or more programs which, when executed by the one or more processors 1120, cause the one or more processors 1120 to implement the anomaly detection method described in the embodiments of the present application.

The terminal provided above may be configured to execute the anomaly detection method provided in any of the above embodiments, and has corresponding functions and beneficial effects.

An embodiment of the present application also provides a storage medium for storing executable instructions which, when executed by a computer processor, cause the computer processor to perform an anomaly detection method including:
  generating at least one clustering set of objects based on configuration data and performance indicator data of the objects;
  determining an algorithm configuration parameter corresponding to each clustering set based on a preset anomaly detection algorithm and the performance indicator data corresponding to the objects in the clustering set; and
  determining abnormal performance indicator data of the objects in the corresponding clustering set based on the algorithm configuration parameter, so as to determine abnormal objects based on the abnormal performance indicator data.

The above is merely a number of embodiments of the present application, and is not intended to limit the scope of protection of the present application.

In general, various embodiments of the present application may be implemented in hardware or dedicated circuitry, software, logic, or any combination thereof. For example, some aspects may be implemented in hardware, while other aspects may be implemented in firmware or software that may be executed by a controller, microprocessor, or other computing device, although the present application is not limited thereto.

A block diagram of any logic flow in the accompanying drawings of the present application may represent program steps, or may represent interconnected logic circuits, modules, and functions, or may represent a combination of program steps and logic circuits, modules, and functions. A computer program may be stored in a memory. The memory may be of any type suitable for a local technical environment and may be implemented using any suitable data storage technology, such as, but not limited to, read only memory (ROM), random access memory (RAM), optical memory device and system (digital versatile disc (DVD) or CD disc). The computer readable medium may include a non-transitory storage medium. The data processor may be of any type suitable for a local technical environment, such as, but not limited to, general purpose computer, special purpose computer, microprocessor, digital signal processor (DSP), application specific integrated circuit (ASIC), field programmable gate array (FGPA), and processor based on a multi-core processor architecture.

The invention claimed is:

1. An anomaly detection method, comprising:
   generating at least one clustering set of objects based on configuration data and performance indicator data of the objects;
     determining an algorithm configuration parameter corresponding to each clustering set based on a preset anomaly detection algorithm and the performance indicator data corresponding to the objects in the clustering set; and
     determining, based on the algorithm configuration parameter, abnormal performance indicator data of the objects in the corresponding clustering set, so as to determine abnormal objects based on the abnormal performance indicator data.

2. The method of claim 1, wherein the objects comprise function modules for constructing a wireless communication network system.

3. The method of claim 1, wherein the generating at least one clustering set of objects based on configuration data and performance indicator data of the objects comprises:
   generating at least one clustering set of the objects based on configuration data, performance indicator data and operation state data of the objects.

4. The method of claim 3, wherein the operation state data comprises one or more of service quality data, measurement report, call tracing data, signaling tracing data, and user complaint data.

5. The method of claim 3, wherein the generating at least one clustering set of the objects based on configuration data, performance indicator data and operation state data of the objects comprises:
   acquiring the configuration data of the objects, and clustering the objects based on the configuration data to generate a first clustering set of the objects;
   acquiring the performance indicator data of the objects, and clustering the objects based on the performance indicator data to generate a second clustering set of the objects;
   acquiring the operation state data of the objects, and clustering the objects based on the operation state data to generate a third clustering set of the objects; and
   performing logical operations on the first clustering set, the second clustering set and the third clustering set based on a preset rule to obtain at least one clustering set of the objects.

6. The method of claim 1, wherein the determining an algorithm configuration parameter corresponding to each clustering set based on a preset anomaly detection algorithm and the performance indicator data corresponding to the objects in the clustering set comprises:
   training the preset anomaly detection algorithm based on the performance indicator data of the objects in each clustering set to obtain the algorithm configuration parameter corresponding to each clustering set.

7. The method of claim 1, wherein the determining, based on the algorithm configuration parameter, abnormal performance indicator data of the objects in the corresponding clustering set comprises:
   acquiring target performance indicator data corresponding to the objects in the clustering set to be detected;
   determining a target algorithm configuration parameter corresponding to the clustering set to be detected; and
   performing anomaly detection on the target performance indicator data based on the preset anomaly detection algorithm and the target algorithm configuration parameter, and determining abnormal performance indicator data in the target performance indicator data based on anomaly detection results.

8. The method of claim 1, further comprising:
   after the determining an abnormal object based on the abnormal performance indicator data,
     generating, a set of abnormal objects to be determined based on the abnormal objects;
     acquiring a logical dependency between the objects in the wireless communication network system, wherein the logical dependency is determined based on the configuration data;
     determining a logical causality between the abnormal objects in the set of abnormal objects to be determined based on the logical dependency between the objects; and
     adjusting the set of abnormal objects to be determined based on the logical causality to obtain a set of abnormal objects.

9. A device, comprising:
a memory, and one or more processors, wherein the memory is configured to store one or more programs; and
the one or more programs, when executed by the one or more processors, cause the one or more processors to perform an anomaly detection method comprising:
generating at least one clustering set of objects based on configuration data and performance indicator data of the objects;
determining an algorithm configuration parameter corresponding to each clustering set based on a preset anomaly detection algorithm and the performance indicator data corresponding to the objects in the clustering set; and
determining, based on the algorithm configuration parameter, abnormal performance indicator data of the objects in the corresponding clustering set, so as to determine abnormal objects based on the abnormal performance indicator data.

10. The device of claim 9, wherein the objects comprise function modules for constructing a wireless communication network system.

11. The device of claim 9, wherein the generating at least one clustering set of objects based on configuration data and performance indicator data of the objects comprises:
generating at least one clustering set of the objects based on configuration data, performance indicator data and operation state data of the objects.

12. The device of claim 11, wherein the operation state data comprises one or more of service quality data, measurement report, call tracing data, signaling tracing data, and user complaint data.

13. The device of claim 11, wherein the generating at least one clustering set of the objects based on configuration data, performance indicator data and operation state data of the objects comprises:
acquiring the configuration data of the objects, and clustering the objects based on the configuration data to generate a first clustering set of the objects;
acquiring the performance indicator data of the objects, and clustering the objects based on the performance indicator data to generate a second clustering set of the objects;
acquiring the operation state data of the objects, and clustering the objects based on the operation state data to generate a third clustering set of the objects; and
performing logical operations on the first clustering set, the second clustering set and the third clustering set based on a preset rule to obtain at least one clustering set of the objects.

14. The device of claim 9, wherein the determining an algorithm configuration parameter corresponding to each clustering set based on a preset anomaly detection algorithm and the performance indicator data corresponding to the objects in the clustering set comprises:
training the preset anomaly detection algorithm based on the performance indicator data of the objects in each clustering set to obtain the algorithm configuration parameter corresponding to each clustering set.

15. The device of claim 9, wherein the determining, based on the algorithm configuration parameter, abnormal performance indicator data of the objects in the corresponding clustering set comprises:
acquiring target performance indicator data corresponding to the objects in the clustering set to be detected;
determining a target algorithm configuration parameter corresponding to the clustering set to be detected; and
performing anomaly detection on the target performance indicator data based on the preset anomaly detection algorithm and the target algorithm configuration parameter, and determining abnormal performance indicator data in the target performance indicator data based on anomaly detection results.

16. The device of claim 9, wherein the one or more programs, when executed by the one or more processors, further cause the one or more processors to perform steps of:
after the determining an abnormal object based on the abnormal performance indicator data,
generating, a set of abnormal objects to be determined based on the abnormal objects;
acquiring a logical dependency between the objects in the wireless communication network system, wherein the logical dependency is determined based on the configuration data;
determining a logical causality between the abnormal objects in the set of abnormal objects to be determined based on the logical dependency between the objects; and
adjusting the set of abnormal objects to be determined based on the logical causality to obtain a set of abnormal objects.

17. A non-transitory storage medium storing a computer program, wherein the computer program, when executed by a processor, causes the processor to perform an anomaly detection method comprising:
generating at least one clustering set of objects based on configuration data and performance indicator data of the objects;
determining an algorithm configuration parameter corresponding to each clustering set based on a preset anomaly detection algorithm and the performance indicator data corresponding to the objects in the clustering set; and
determining, based on the algorithm configuration parameter, abnormal performance indicator data of the objects in the corresponding clustering set, so as to determine abnormal objects based on the abnormal performance indicator data.

18. The non-transitory storage medium of claim 17, wherein the objects comprise function modules for constructing a wireless communication network system.

19. The non-transitory storage medium of claim 17, wherein the generating at least one clustering set of objects based on configuration data and performance indicator data of the objects comprises:
generating at least one clustering set of the objects based on configuration data, performance indicator data and operation state data of the objects.

20. The non-transitory storage medium of claim 19, wherein the operation state data comprises one or more of service quality data, measurement report, call tracing data, signaling tracing data, and user complaint data.

21. The non-transitory storage medium of claim 19, wherein the generating at least one clustering set of the objects based on configuration data, performance indicator data and operation state data of the objects comprises:
acquiring the configuration data of the objects, and clustering the objects based on the configuration data to generate a first clustering set of the objects;

acquiring the performance indicator data of the objects, and clustering the objects based on the performance indicator data to generate a second clustering set of the objects;

acquiring the operation state data of the objects, and clustering the objects based on the operation state data to generate a third clustering set of the objects; and performing logical operations on the first clustering set, the second clustering set and the third clustering set based on a preset rule to obtain at least one clustering set of the objects.

22. The non-transitory storage medium of claim 17, wherein the determining an algorithm configuration parameter corresponding to each clustering set based on a preset anomaly detection algorithm and the performance indicator data corresponding to the objects in the clustering set comprises:

training the preset anomaly detection algorithm based on the performance indicator data of the objects in each clustering set to obtain the algorithm configuration parameter corresponding to each clustering set.

23. The non-transitory storage medium of claim 17, wherein the determining, based on the algorithm configuration parameter, abnormal performance indicator data of the objects in the corresponding clustering set comprises:

acquiring target performance indicator data corresponding to the objects in the clustering set to be detected;

determining a target algorithm configuration parameter corresponding to the clustering set to be detected; and performing anomaly detection on the target performance indicator data based on the preset anomaly detection algorithm and the target algorithm configuration parameter, and determining abnormal performance indicator data in the target performance indicator data based on anomaly detection results.

24. The non-transitory storage medium of claim 17, wherein the computer program, when executed by a processor, further causes the processor to perform steps of:

after the determining an abnormal object based on the abnormal performance indicator data, generating, a set of abnormal objects to be determined based on the abnormal objects;

acquiring a logical dependency between the objects in the wireless communication network system, wherein the logical dependency is determined based on the configuration data;

determining a logical causality between the abnormal objects in the set of abnormal objects to be determined based on the logical dependency between the objects; and adjusting the set of abnormal objects to be determined based on the logical causality to obtain a set of abnormal objects.

* * * * *